United States Patent
Shankara

(10) Patent No.: US 7,353,331 B2
(45) Date of Patent: Apr. 1, 2008

(54) HOLE-FILLING CONTENT ADDRESSABLE MEMORY (HCAM)

(75) Inventor: Udaya Shankara, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 330 days.

(21) Appl. No.: 11/244,908

(22) Filed: Oct. 5, 2005

(65) Prior Publication Data

US 2007/0086472 A1    Apr. 19, 2007

(51) Int. Cl.
 G06F 12/00   (2006.01)
 H04L 12/54   (2006.01)
(52) U.S. Cl. .................... 711/108; 711/165; 370/428; 713/324
(58) Field of Classification Search ...................... None
 See application file for complete search history.

(56) References Cited

U.S. PATENT DOCUMENTS

| 6,101,573 A * | 8/2000 | Middleton et al. .......... 711/108 |
| 6,560,671 B1 * | 5/2003 | Samra et al. ............... 711/108 |
| 2003/0005210 A1 * | 1/2003 | Thummalapally et al. ..... 711/1 |

OTHER PUBLICATIONS

Devavrat Shah, Pankaj Gupta;Fast Updating Algorithms for TCAMs;IEEE Micro;Jan.-Feb. 2001; pp. 36-47.

* cited by examiner

*Primary Examiner*—Kevin Verbrugge
(74) *Attorney, Agent, or Firm*—Murthy S.K.

(57) ABSTRACT

A network device comprising a content addressable memory (CAM), based on partitioning and the hole-filling technique, may utilize substantially less power by switching ON only the partitions that are being used. Also, the CAM may quickly add one or more new entries into the memory by consuming substantially less amount of time while updating the entries.

26 Claims, 10 Drawing Sheets

| ENTRY | PORT ID |
|---|---|
| 1001 | 210-1 |
| 1002 | 210-2 |
| 1003 | |
| 1004 | 210-3 |
| 1021 | 210-3 |
| 1022 | |
| 1023 | 210-4 |
| 1024 | 210-5 |
| 1025 | |

(b)

| ENTRY | PORT ID |
|---|---|
| 1001 | 210-1 |
| 1002 | 210-2 |
| 1003 | |
| 1004 | 210-3 |
| 1005 | 210-1 |
| 1021 | 210-3 |
| 1022 | |
| 1023 | 210-4 |
| 1024 | 210-5 |
| 1025 | |

(c)

| ENTRY | PORT ID | VALID BIT | LOCK BIT |
|---|---|---|---|
| 1001 | 210-1 | 1 | 1 |
| 1002 | 210-2 | 1 | 0 |
| 1003 | | 0 | 0 |
| 1004 | 210-3 | 1 | 0 |
| 1021 | 210-3 | 1 | 1 |
| 1022 | | 0 | 0 |
| 1023 | 210-4 | 1 | 0 |
| 1024 | 210-5 | 1 | 0 |
| 1025 | | 0 | 0 |

1005 ↗

(d)

| ENTRY | PORT ID | VALID BIT | LOCK BIT |
|---|---|---|---|
| 1001 | 210-1 | 1 | 1 |
| 1002 | 210-2 | 1 | 0 |
| 1004 | 210-3 | 1 | 0 |
| 1003 | | 0 | 0 |
| 1021 | 210-3 | 1 | 1 |
| 1022 | | 0 | 0 |
| 1023 | 210-4 | 1 | 0 |
| 1024 | 210-5 | 1 | 0 |
| 1025 | | 0 | 0 |

(e)

| ENTRY | PORT ID | VALID BIT | LOCK BIT |
|---|---|---|---|
| 1001 | 210-1 | 1 | 1 |
| 1002 | 210-2 | 1 | 0 |
| 1004 | 210-3 | 1 | 0 |
| 1005 | 210-1 | 1 | 1 |
| 1021 | | 0 | 0 |
| 1022 | | 0 | 0 |
| 1023 | 210-4 | 1 | 0 |
| 1024 | 210-5 | 1 | 0 |
| 1025 | | 0 | 0 |

HOLE-FILLING CONTENT ADDRESSABLE MEMORY (HCAM)

BACKGROUND

A computer network generally refers to a group of interconnected wired and/or wireless medium network devices such as laptop and desktop computers, mobile phones, servers, fax machines, and printers, which may communicate with each other and may share resources as well. An intermediate network device such as a switch and/or a router may be provisioned in the path between end network devices such as a client and a server system. The intermediate network devices after receiving a packet may, for example, determine a port on which the packet may be sent onward or search the payload for the presence of one or more specific strings.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 10 illustrates an embodiment of one or more regions of the HCAM that efficiently update the entries.

DETAILED DESCRIPTION

The following description describes a hole-filling content addressable memory (HCAM). In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
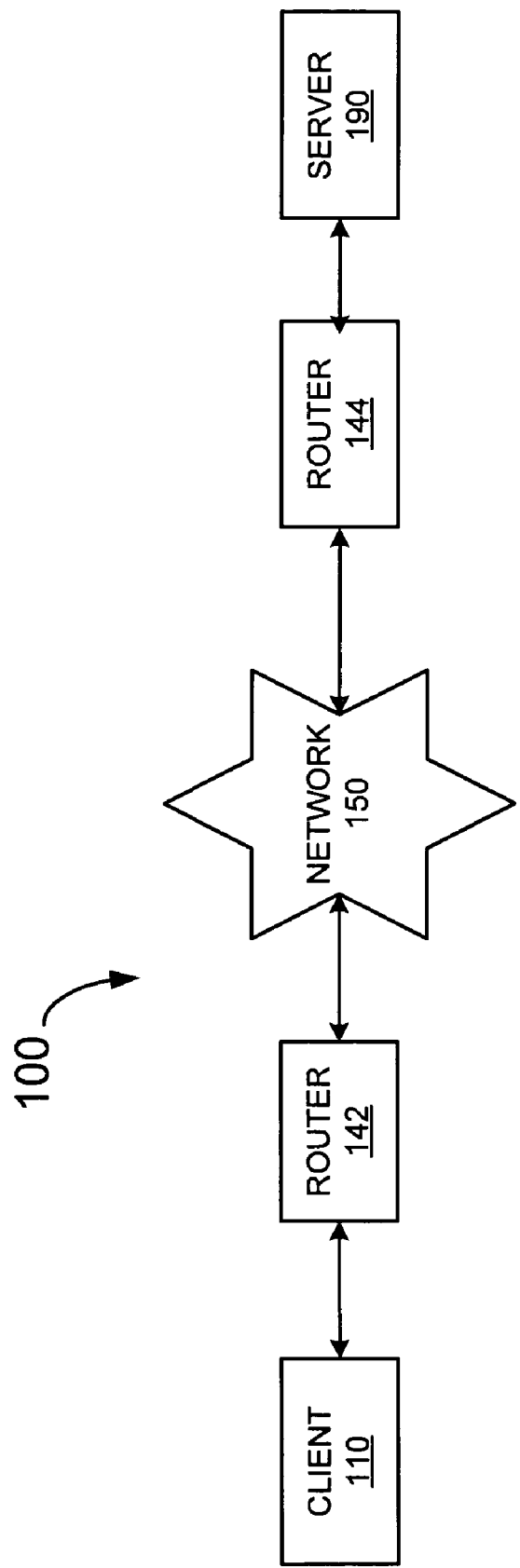
FIG. 1 illustrates an embodiment of a network environment.

An embodiment of a network environment 100 is illustrated in FIG. 1. The network environment 100 may comprise a network 150 and network devices such as a client 110, router 142 and 144, and server 190. For illustration, the network environment 100 is shown comprising a small number of each type of network devices. However, a typical network environment may comprise a large number of each type of such network devices.

The client 110 may comprise a computer system such as a desktop or a laptop computer that comprises various hardware, software, and firmware components to generate and send data packets to a destination system such as the server 190. The client 110 may be connected to the router 142 via a local area network (LAN) or any other wired or wireless medium to transfer packets or data units. The client 110 may, for example, support protocols such as hyper text transfer protocol (HTTP), file transfer protocols (FTP), TCP/IP and such other protocols.

The server 190 may comprise a computer system capable of generating and sending responses to requests received from a network device such as the client 110. The server 190 may be coupled to the router 144 via LAN or any wired or wireless network. The server 190 may, for example, comprise a web server, a transaction server, a database server, or any such server systems.

The network 150 may comprise one or more intermediate network devices such as switches and routers, which may receive, process, and send the packets to an appropriate network device. The network 150 may enable end network systems such as the client 110 and the server 190 to transmit and receive data. The intermediate network devices of the network 150 may be configured to support various protocols such as TCP/IP.

The routers 142 and 144 may enable transfer of packets between the end network devices such as the client 110 and the server 190 via the network 150. In one embodiment, the router 142 may comprise Intel® IXP 2400® network processor for performing packet processing. The router 142 after receiving a packet from the client 110 may determine, for example, the next router provisioned in the path and forward the packet to the next router. A packet received from the network 150 may be forwarded to the client 110 as well. The router 142 may determine the next router based on routing table entries stored in the router 142.

The routers 142 and 144 may support security, billing, quality-of-service, and such other applications as well. In one embodiment, the routers 142 and 144 may search the packet payloads to detect the presence of one or more strings of the pre-defined string set. The applications supported by the router 142 may peek into the packet payload for string searching, load balancing and such other purposes. In another embodiment, the routers 142 and 144 may determine the destination address of an incoming packet based on, for example, longest prefix matching (LPM) technique. The routers 142, 144, or any other network device may utilize substantial computational resources to determine, for example, the presence of one or more pre-defined strings in the packet payload or the output port identifiers to forward the packets further or the destination address of the incoming packet.

Figure 2:
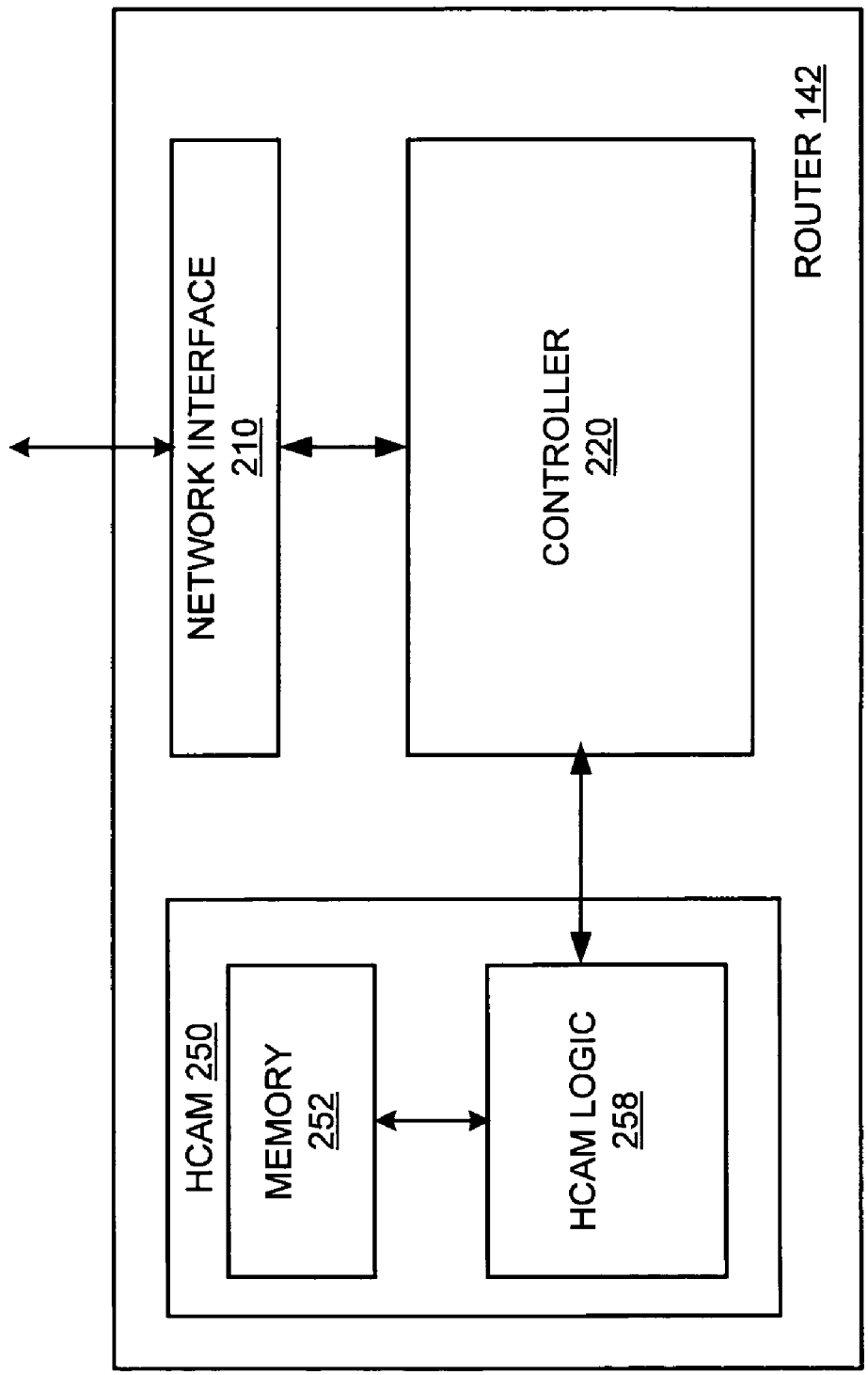
FIG. 2 illustrates an embodiment of a router of the network environment of FIG. 1.

An embodiment of the router 142 is illustrated in FIG. 2. The router 142 may comprise a network interface 210, a controller 220, and a hole-filling content addressable memory (HCAM) 250.

The network interface 210 may receive one or more packets and send the packets to the controller 220. The network interface 210 may receive processed packets from the controller 220 and send the packets via appropriate output ports. For example, the network interface 210 may receive a packet from the client 110, send the packet to the controller 220, receive the processed packet and a corresponding output port identifier from the controller 220, and forward the packet to an appropriate network device of the network 150. The network interface 210 may provide physical, electrical, and protocol interfaces to transfer packets between the systems coupled to the router 142.

The controller 220 may receive a packet from the network interface 210 and extract a destination address or the payload form the packet. The controller 220 may provide the extracted data to the HCAM 250. In response, the controller 220 may receive an output port identifier, determined based on LPM technique, on which the packet may be sent onward or a signal indicating either the presence or absence of one or more pre-defined strings in the payload. The controller 220 after receiving the response may forward or drop the packet based on the output port identifier or make an appropriate decision based on the signal. In one embodiment, the controller 220 may discard the packet as undeliverable on not receiving an output port identifier and may send a message such as an Internet Control Message Protocol (ICMP) notification to the sending device.

The controller 220 may construct a routing table comprising address prefixes and corresponding port identifiers based on the routing protocols. In one embodiment, the controller 220 may use protocols such as a distance vector protocol or a link state routing algorithm and routing table entries received from adjacent routers to construct the routing tables. The controller 220 may periodically send the updated entries to the HCAM 250. Also, the controller 220 may receive a set of pre-defined strings to be detected in the packet payload and may provide the set of pre-defined strings to the HCAM 250. The set of pre-defined strings may change as well.

The HCAM 250 may be implemented to quickly perform a lookup, for example, to determine the output port identifier on which an incoming packet may be forwarded onward, to detect presence of one or more pre-defined strings in the packet payload and such other matching operations. In one embodiment, the HCAM 250 may determine the output port identifier based on the longest prefix match technique. The HCAM 250 may comprise a memory 252 to store the entries and a HCAM logic 258 to process the incoming packet data based on the stored entries.

The memory 252 may comprise one or more memory locations to store the entries. In one embodiment, the memory 252 may comprise binary storage elements each capable of storing a zero or a one or ternary storage elements each capable of storing a zero, one, or don't care bit (0, 1, *). In one embodiment, the memory 252 may store entries in a sorted order, for example, with longest prefixes at the lower address location and the shortest prefix stored at higher address locations. One or more memory locations of the memory 252 may be grouped to form partitions and each partition may in turn comprise one or more regions. The regions may comprise a sub-set of the memory locations of the corresponding partition.

The HCAM logic 258 may update the entries stored in the memory 252 based on, for example, the routing table entries or a pre-defined string set received from the controller 220. The HCAM logic 258 may store a new entry and/or delete an existing entry while updating the HCAM 250. While the HCAM logic 258 deletes one or more entries an empty space referred as a 'hole' may be created in the memory 252. As a result of updating the HCAM 250, the position and the number of entries stored in the memory 252 may change. However, the size of the memory 252 may be chosen to store maximum number of entries, for example, based on the worst case scenario. Such an approach may require the memory 252 to comprise higher number of memory locations.

In one embodiment, the HCAM logic 258, while determining the output port identifier may store the entries in a sorted order and compare the key (e.g., IP address of the packet or a portion of the pre-defined string) with the entries starting from the lowest address and may determine the longest prefix match. The HCAM logic 258 may continue to compare until determining the presence of a key or until all the entries are compared. For example, if the memory 252 comprises 200 entries and the entry comprising the key may be stored at the $195^{th}$ location, the HCAM logic 258 may search all the 195 entries before determining the presence of the key. As a result, the HCAM 250 may consume substantially high power to perform such comparisons. It may be desirable to maintain the power consumption of the HCAM 250 substantially low.

Also, while updating the entries, the HCAM logic 258 may move one or more entries to add a new entry to an appropriate memory location of the memory 252. For example, the HCAM logic 258 may add a new entry at the tenth location of the memory 252 and in the process the HCAM logic 258 may move entries stored in locations 10 to 40 to locations 11 to 41. As a result of adding the new entry, the HCAM logic 258 may move 30 entries. The HCAM 250 may consume substantial amount of time to update the entries and during the update periods the HCAM 250 may be unavailable for performing comparison operations. It may be desirable to maintain such update periods substantially small.

Figure 3:
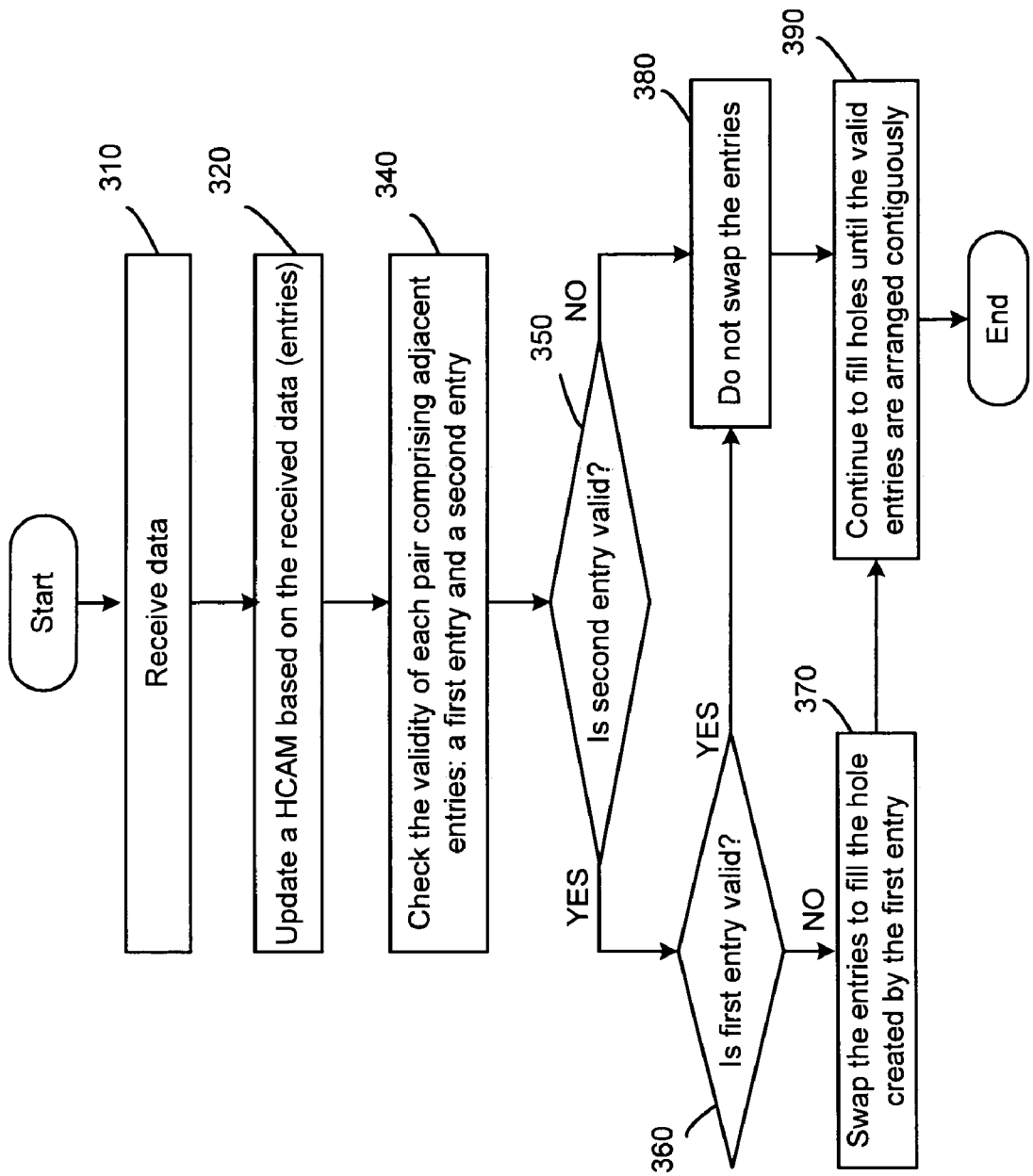
FIG. 3 illustrates an operation of an embodiment of the router based on hole-filling technique.

An embodiment of an operation of the HCAM 250 is illustrated in FIG. 3. In block 310, the HCAM 250 may receive data representing, for example, an updated routing table or an updated pre-defined string set.

In block 320, the HCAM logic 258 may update the entries based on the data received in block 310. In one embodiment, the HCAM logic 258 may add and/or delete entries in the memory 252.

In block 340, the HCAM logic 258 may check the validity of each entry of each pair of adjacent entries. In one embodiment, the HCAM logic 258 may check the status of the valid bit of each entry in each pair. For example, the HCAM logic 258 may check the status of the valid bit of a first entry and a second entry of the first pair. An entry may be valid if the corresponding valid bit equals logic 1 and invalid otherwise. In one embodiment, an invalid entry may represent a hole.

In block 350, the HCAM logic 258 may check if the second entry is valid and the HCAM logic 258 may cause control to pass to block 360 if the second entry is valid and to block 380 otherwise.

In block 360, the HCAM logic 258 may check if the first entry is valid and may cause control to pass to block 370 if the first entry is invalid and to block 380 otherwise. In one embodiment, the HCAM logic 258 may determine if the first entry is valid by checking the valid bit corresponding to the first entry.

In block 370, the HCAM logic 258 may swap the first entry and the second entry to fill the hole created by the first entry. In one embodiment, such swapping may cause the second entry to occupy the memory location of the first entry in the memory 252 and the first entry may occupy the memory location of the second entry. In other words, such a technique fills up the hole created by the invalid first entry with a valid second entry.

In block 380, the HCAM logic 258 may not swap the entries as the second entry is invalid.

In block 390, the HCAM logic 258 may continue to fill the holes until the valid entries are arranged contiguously, for example, starting from the lowest address. In one embodiment, such a hole filling technique may cause the valid entries to contiguously occupy a portion in the memory 252 and the invalid entries may occupy the remaining portion in the memory 252. In other words, such a technique may cause all valid entries to be arranged in one portion of the memory 252 without any holes interspersed and all holes arranged in another portion without any valid entries interspersed.

Figure 4:
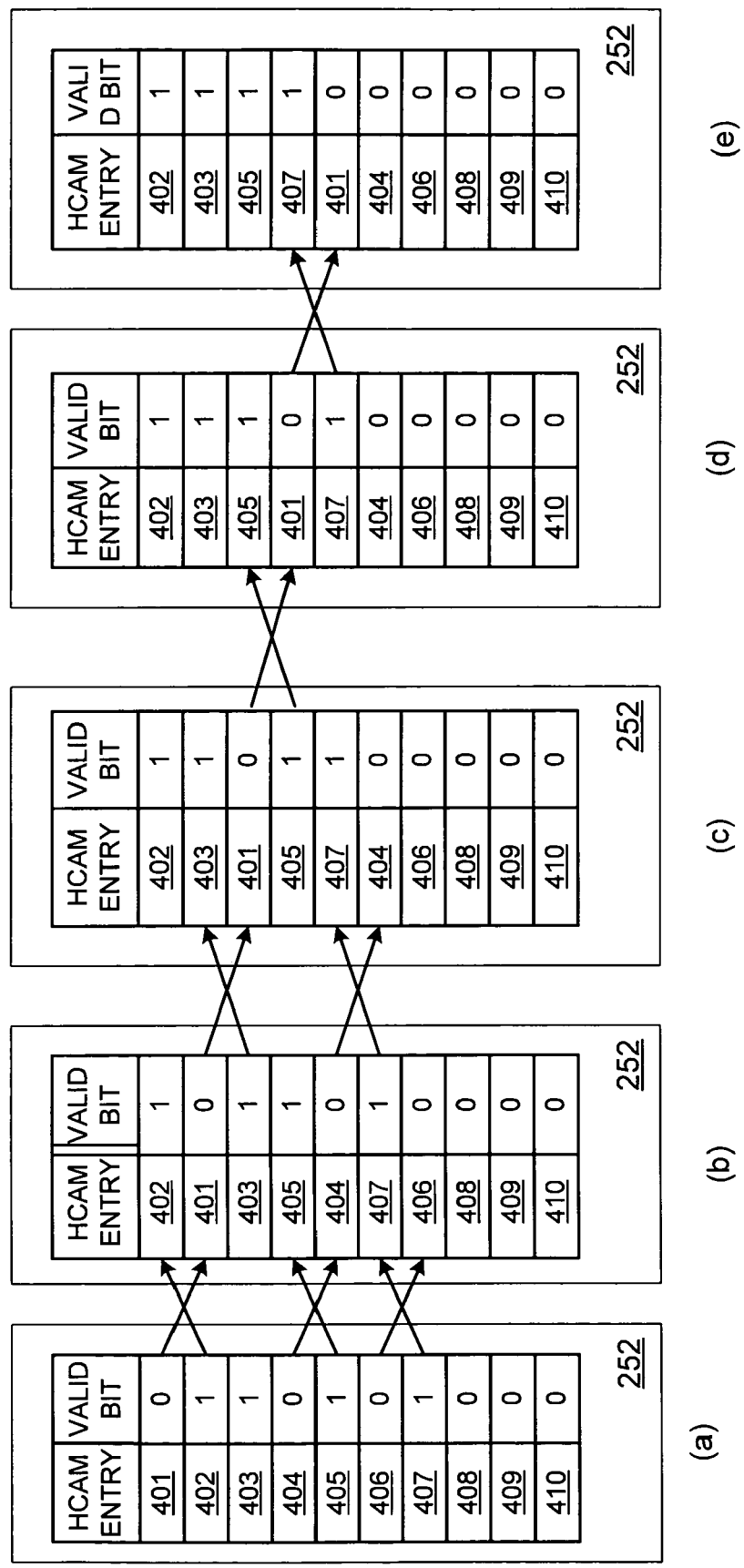
FIG. 4 illustrates an embodiment of a hole filling content addressable memory (HCAM).

An embodiment of HCAM 250 that illustrates the hole-filling technique is shown in FIG. 4. As noted in block 310 and 320 of FIG. 3, the HCAM logic 258 may update the memory 252 with entries 401-410 as shown in FIG. 4(a). The entries 401, 404, 406, and 408-410 with the valid bit equaling logic 0 are invalid entries and entries 402, 403, 405, and 407 with valid bit equaling logic 1 are valid entries.

The pair of entries G1 through G9 may equal (401, 402), (402, 403), (403, 404), (404, 405), (405, 406), (406, 407), (407, 408), (408, 409), and (409, 410) respectively. In the pairs G1, G4, and G6 the entries 401, 404, and 406 are invalid entries and 402, 405, and 407 are valid entries respectively. Thus, the HCAM logic 258 may swap entries 401 and 402, 404 and 405, and 406 and 407 of memory 252. As a result, the memory 252 may comprise entries in the order 402, 401, 403, 405, 404, 407, 406, 408, 409, and 410 as shown in FIG. 4(b).

The HCAM logic 258 may continue to fill holes until all the valid entries are moved to portion of the memory 252. The progression of hole filling, with reference to the above example, is illustrated in FIGS. 4(c), 4(d) and 4(e). The FIG. 4(c) is shown comprising entries (402, 403, 401, 405, 407, 404, 406, 408, 409, and 410). The FIG. 4(d) is shown comprising entries (402, 403, 405, 401, 407, 404, 406, 408, 409, and 410), and FIG. 4(e) is shown comprising entries (402, 403, 405, 407, 401, 404, 406, 408, 409, and 410). As a result, the valid entries 402, 403, 405, and 407 are contiguously arranged starting from the lowest address of the memory 252 and the holes are arranged contiguously after the valid entries.

Figure 5:
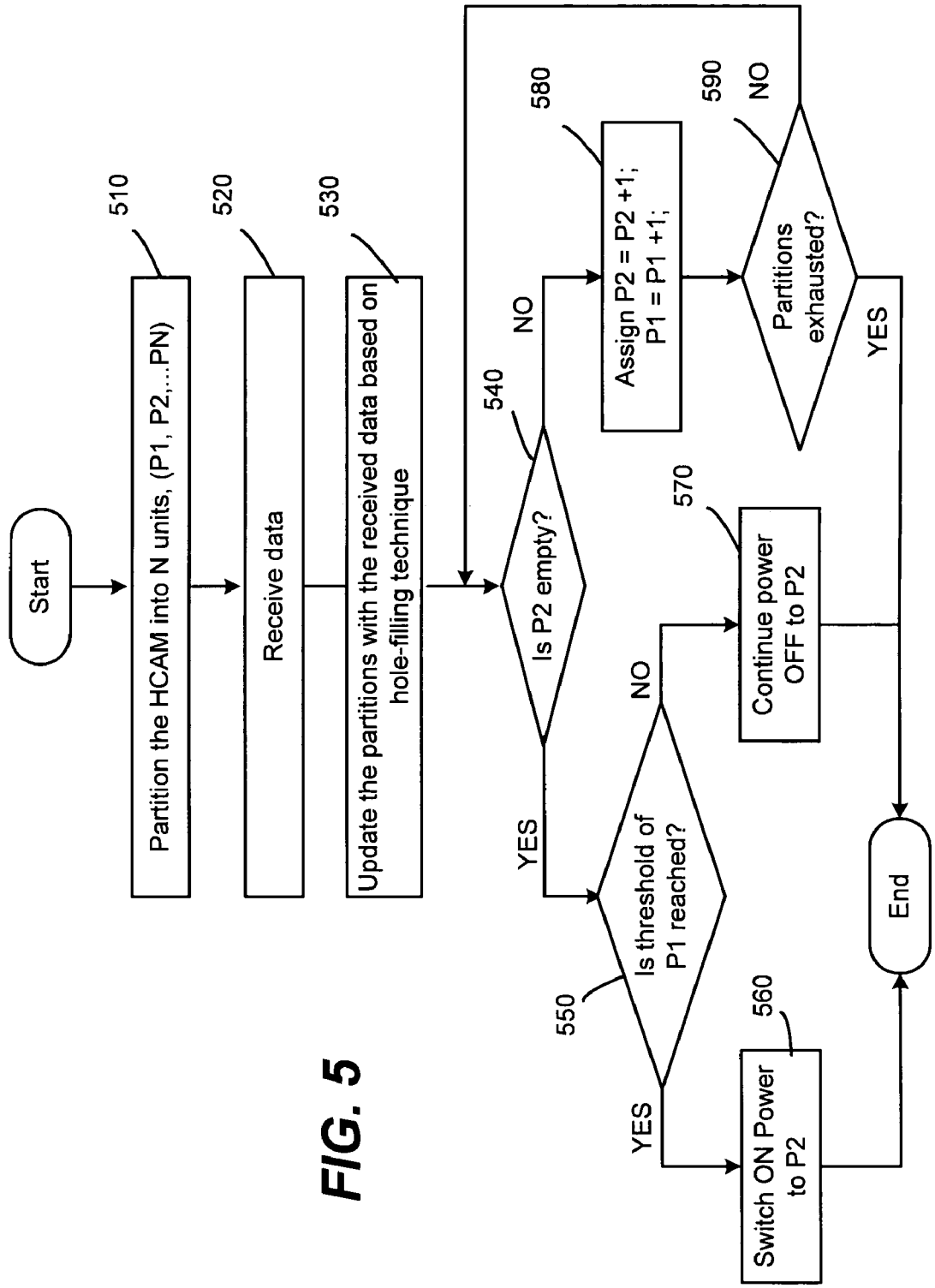
FIG. 5 and FIG. 6 illustrate an operation of an embodiment of the HCAM that saves power by selectively switching ON/OFF the partitions of the HCAM.

An embodiment of an operation of the HCAM logic 258 that saves the power utilized by the HCAM 250 by switching ON the used partitions is shown in FIG. 5. In block 510, the HCAM logic 258 may partition the memory 252 into N units P1, P2, . . . PN. Each partition may in turn comprise a plurality of locations to store entries.

In block 520, the HCAM logic 258 may receive data form the controller 220. As noted above, the data may represent updated routing table entries or pre-defined strings.

In block 530, the HCAM logic 258 may update the partitions based on the hole filling technique described in FIG. 3. As a result, a first entry may be stored in partition Pk after the partition Pk−1 is full.

In block 540, the HCAM logic 258 may check if the partition P2 is empty and the HCAM logic 258 causes control to pass to block 550 if partition P2 is empty and to block 580 otherwise.

In block 550, the HCAM logic 258 may check if the threshold of partition P1 is reached and the HCAM logic 258 causes control to pass to block 560 if threshold of P1 is reached and to block 570 otherwise. In one embodiment, the HCAM logic 258 may determine that the threshold is reached if 80% of partition P1 is full. For example, if partition P1 comprises 10 memory locations for storing entries, the HCAM logic 258 may determine that the threshold is reached after storing an $8^{th}$ entry in partition P1.

In block 560, the HCAM logic 258 may switch ON the power to partition P2. It may be noted that the HCAM logic 258 causes the power to partition P2 to be switched ON after the threshold of P1 is reached and before storing any entry in P2. Such an approach may optimize the time required to update the HCAM 250 as compared to switching ON the partition P2 while storing the first entry in partition P2.

In block 570, the HCAM logic 258 may continue to power OFF the partition P2. As may be noted, the block 570 is reached after determining that the partition P2 is empty and threshold of partition P1 is not reached.

In block 580, the HCAM logic 258 may increment a first variable pointing to partition P1 to now equal partition P2 and increment a second variable pointing to partition P2 to now equal partition P3.

In block 590, the HCAM logic 258 may check whether all the partitions are exhausted and the HCAM logic 258 may repeat the operations of blocks 540-590 until all the partitions are exhausted.

Figure 6:
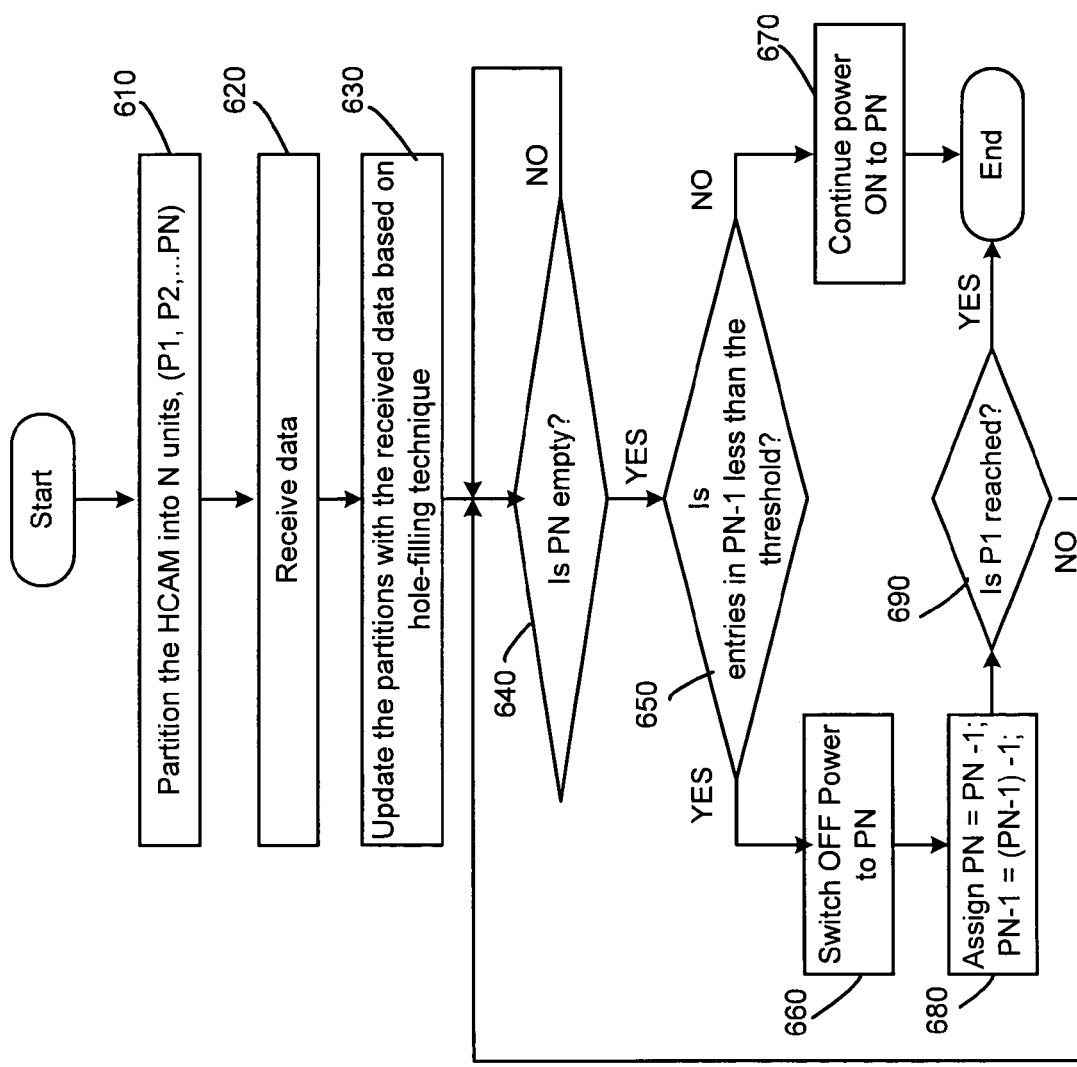

An embodiment of an operation of the HCAM logic 258 that saves the power utilized by the HCAM 250 by switching OFF the unused partitions is shown in FIG. 6. Blocks 610, 620, and 630 are similar to blocks 510, 520, and 530 respectively and the description is not repeated for conciseness.

In block 640, the HCAM logic 258 may determine whether the partition PN is empty. The block 650 is reached if the partition PN is empty and is looped back otherwise.

In block 650, the HCAM logic 258 may determine whether the entries in the partition PN−1 are less than the threshold of PN−1. The block 660 is reached if the number of entries in PN−1 is less than the threshold of PN−1 and to block 670 otherwise.

In block 660, the HCAM logic 258 may cause the power to partition PN to be switched OFF as the partition PN is empty and threshold of partition PN−1 is not reached.

In block 670, the HCAM logic 258 may continue to power ON the partition PN as the number of entries in the partition PN−1 is greater than the threshold of the partition PN−1.

In block 680, the HCAM logic 258 may assign a variable that equaled PN to now equal PN−1 and another variable that equaled PN−1 to now equal PN−2. In block 690, the HCAM logic 258 may check whether partition P1 is reached and the HCAM logic 258 may repeat the operation of blocks 640-490 until the partition P1 is reached.

Figure 7:
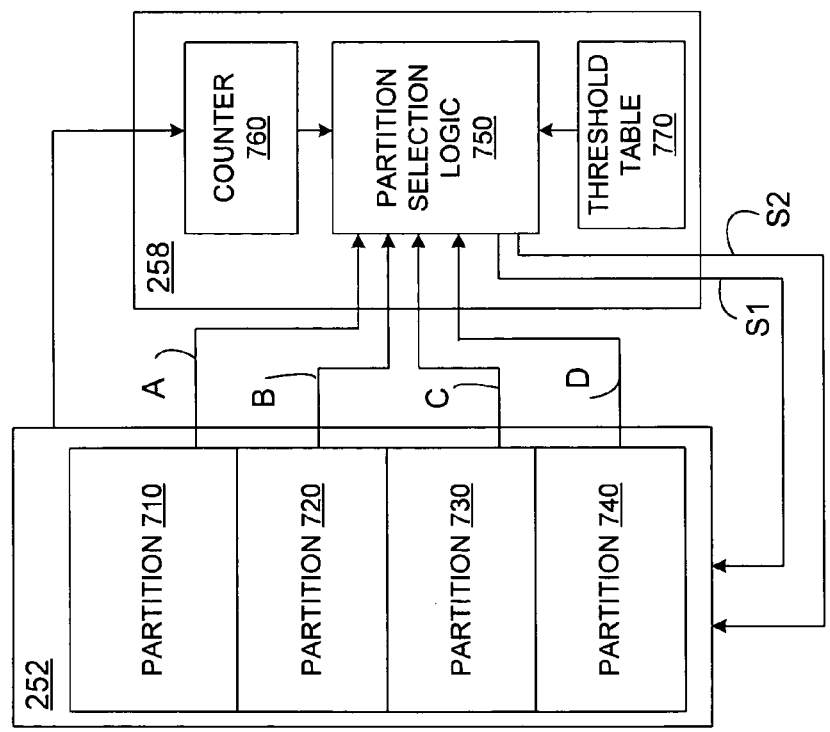
FIG. 7A illustrates an embodiment of the HCAM used to control power supply to the partitions.
FIGS. 7B and 7C illustrates a decision logic based on which the HCAM may consume less power.

An embodiment of the HCAM 250 used to control power consumption of HCAM 250 is illustrated in FIG. 7A. In one embodiment, the HCAM logic 258 may comprise a partition selection logic 750, a counter 760, and a threshold table 770.

The threshold table 770 may store the threshold values T1, T2, T3, and T4 of partitions 710, 720, 730, and 740 respectively. The threshold T1 may, for example, equal 80% of the total number of entries that can be stored in partition 710. The threshold values of each partition may be determined based metrics such as the percentage of the total storage capacity of each partition. The threshold of each partition 710-740 may be stored in the threshold table 770.

The counter 760 may comprise one or more counters to count the number of entries in each partition. For example, the counter 760 may comprise an up-down counter C1 and the counter C1 may increment the count by one each time the partitions 710-740 store an additional entry and may count down by one each time the partitions 710-740 delete an entry already stored in the partitions. The counter C1 may increment or decrement the count based on the signal received from the partitions 710-740.

The partition selection logic 750 may partition the memory 252 into two or more partitions. For example, the memory 252 may be partitioned into four partitions 710, 720, 730, and 740. The partitions 710-740 may assert a pre-specified logic on the corresponding channels A-D after storing at least one entry. For example, the partition 710 may assert a logic 1 on channel A after saving a first entry in partition 710. A first entry in partition 720 may be stored, for example, after the partition 710 is full and partition 720 may then assert a logic level on channel B. The partitions 730 and 740 may assert a signal respectively on channels C and D to indicate the presence of at least one entry in the corresponding partition.

The partition selection logic 750 may determine the partition(s) that may be switched ON or switched OFF based on the entries stored in the partition(s). Such an approach may save the power consumed by the HCAM 250. In one embodiment, the partition selection logic 750 may store the status of channels A, B, C and D in a corresponding bit of a status register. The bit status of the corresponding bits may change to a pre-specified logic level after each partition 710-740 stores at least an entry.

The partition selection logic 750 may receive the counter values from the counter 760 and compare the counter values with the corresponding threshold levels stored in the threshold table 770. The partition selection logic 750 may either switch ON or OFF the power to each partition 710-740 by asserting appropriate logic values on select channels S1 and S2 based on the results of comparison.

In one embodiment, the partition selection logic 750 may read a count value R from the counter 760 and compare the count value R with the threshold values T1-T4 stored in the threshold table 770. For example, if each partition 710-740 stores 10 entries, the corresponding threshold values T1-T4 may be respectively set to equal 8, 18, 28, and 38. In one embodiment, the partition selection logic 750 may operate according to the logic depicted in FIG. 5 while switching ON the power to the partitions starting from partition 710. For example, if the count value R is less than threshold T1 (=8), as depicted in row 785 of FIG. 7B, the partition selection logic 750 may assert logic 0 on both S1 and S2 to cause the partition 710 to be switched ON, while the partitions 720, 730, and 740 remain switched OFF.

If the count value R equals threshold T1 (=8), as depicted in row 786 of FIG. 7B, the partition selection logic 750 may assert logic 0 and logic 1 on select channels S1 and S2 to effect switching ON the power to the partition 720. If the count value R equals threshold T2 (=18), as depicted in row 787 of FIG. 7B, the partition selection logic 750 may switch ON the partition 730. If the count value R equals threshold T3 (=28), as depicted in row 789 of FIG. 7B, the partition selection logic 750 may switch ON the partition 740.

In one embodiment, the partition selection logic 750 may operate according to the logic depicted in FIG. 6 while switching OFF the power to the partitions starting from partition 740. As depicted in blocks 640 and 650 of FIG. 6 and row 795 of FIG. 7C, the partition switching logic 750 may check if the counter value R is less than the threshold T3 and the channel D is asserted. The partition switching logic 750 may switch OFF the power to the partition 740 if the value of R is less than T3 and if D is not asserted. The partition switching logic 750 may assert logic 1 and 0 respectively on channels S1 and S2 to cause the partition 740 to be switched OFF. The partition selection logic 750 may check the conditions depicted in rows 796 and 797, assert logic levels (0 and 1) and (0 and 0) respectively on channels S1 and S2 to cause the partitions 730 and 720 to be switched OFF.

Figure 8:
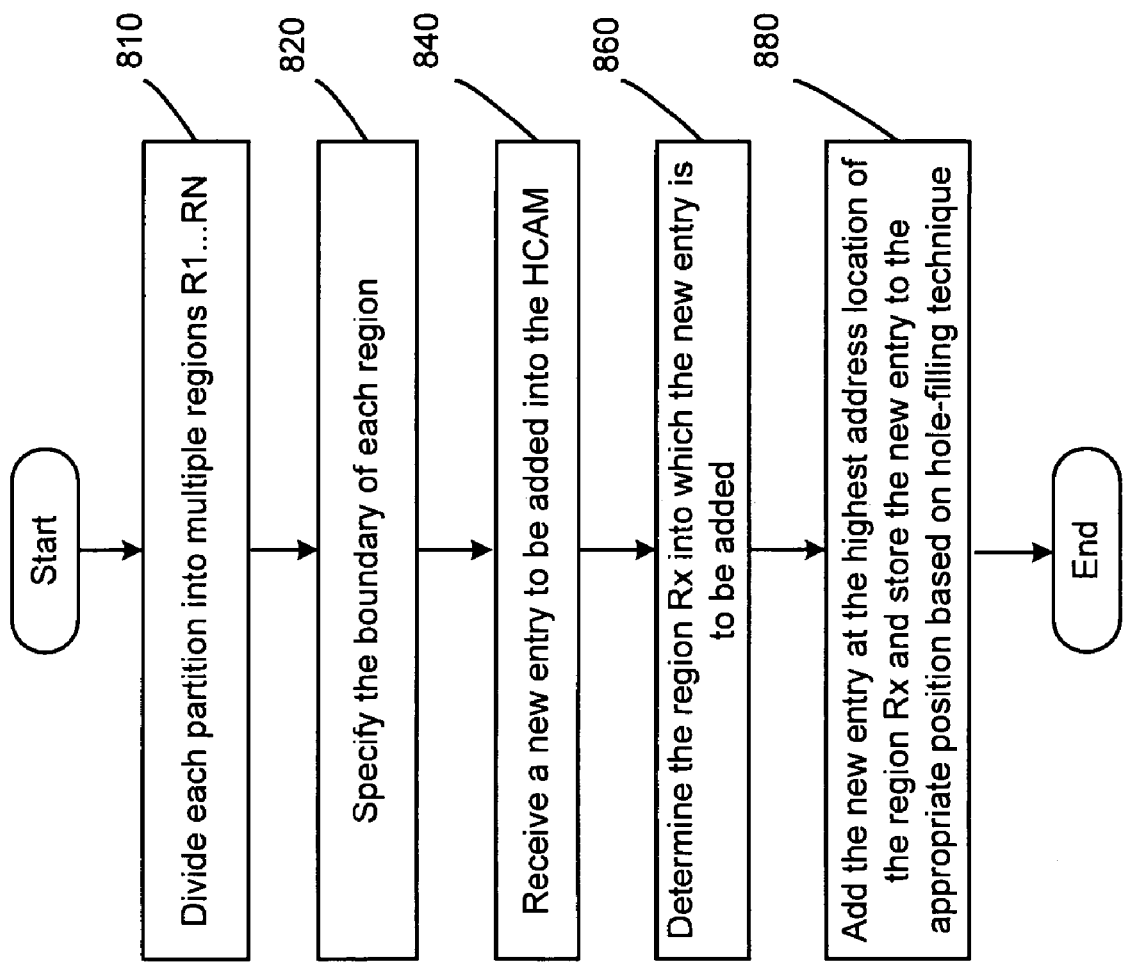
FIG. 8 illustrates an operation of an embodiment of the HCAM that efficiently updates the entries.

An embodiment of an operation of HCAM logic 258 that enables a new entry to be quickly stored into the HCAM 250 is illustrated in FIG. 8. In block 810, the HCAM logic 258 may divide each partition of the memory 252 into multiple regions R1 . . . RN. In one embodiment, each region may store the entries in the sorted order and the HCAM 250 may use longest prefix matching technique to determine the matching entry.

In block 820, the HCAM logic 258 may specify the boundary of each region. In one embodiment, the HCAM logic 258 identifies each region based on an entry stored at the lowest address of each region referred to as an anchor entry and an entry stored at the highest address of each region referred to as a gate entry.

In block 840, the HCAM logic 258 may receive a new entry to be added into the memory 252. In block 860, the HCAM logic 258 may determine, based on the size of the new entry, the region Rx as the region into which the new entry is to be added.

In block 880, the HCAM logic 258 may add the new entry at the highest address of the region Rx. In one embodiment, the HCAM logic 258 may add the new entry at the highest address that corresponds to a gate entry of the region Rx and store the new entry to an appropriate position based on the hole-filling technique. In one embodiment, the HCAM logic 258 may cause the new entry to be stored in an appropriate position of the corresponding region based on the comparison of valid bits of the pair of entries.

Figure 9:
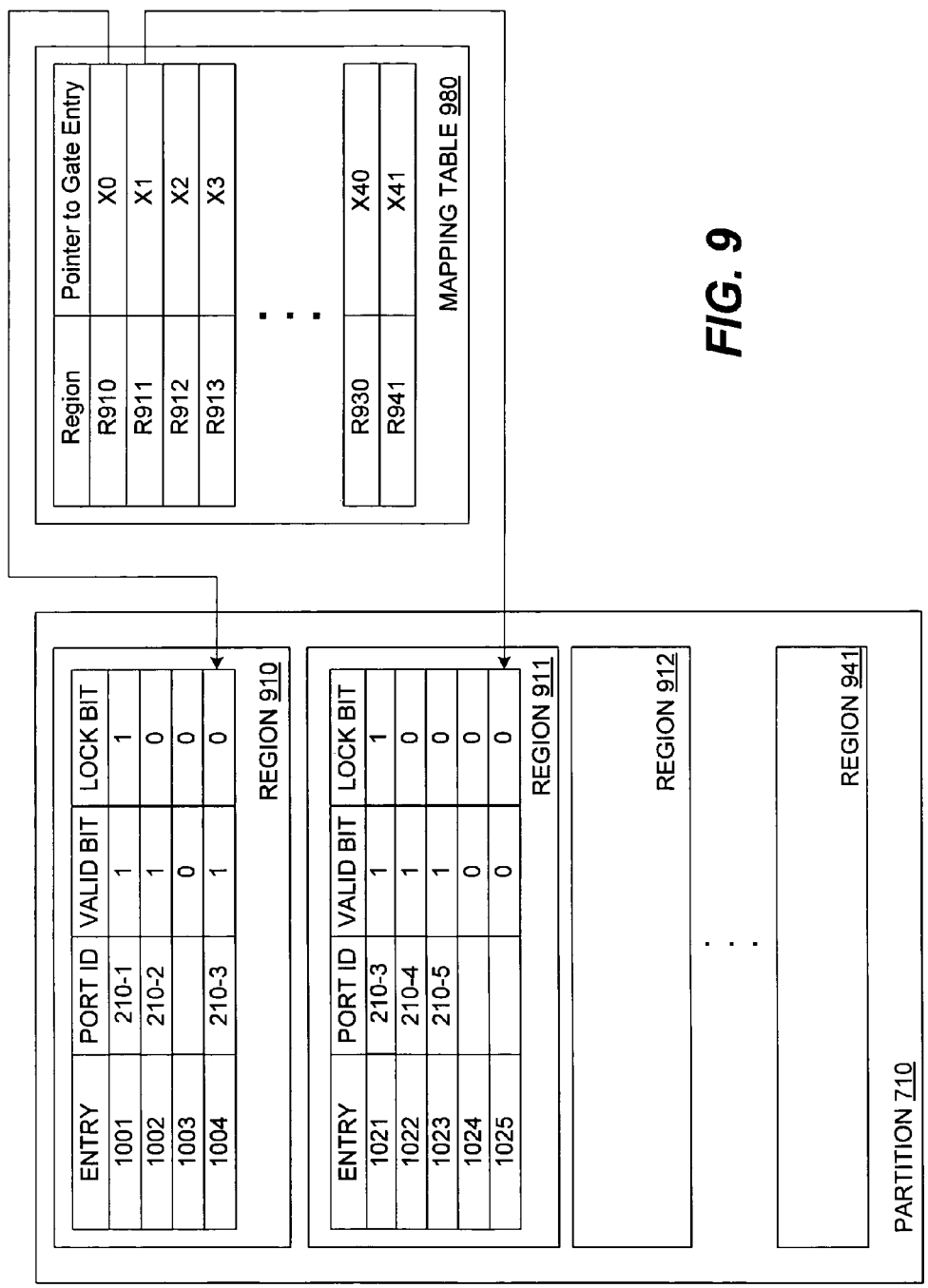
FIG. 9 illustrates an embodiment of the HCAM used to quickly add one or more new entries while updating the HCAM.

An embodiment of the HCAM 250 enabling a new entry to be added quickly into the HCAM 250 is depicted in FIG. 9. In one embodiment, the HCAM 250 is shown comprising a single partition 710 being divided into one or more regions. In one embodiment, the HCAM logic 258 may divide the region 710 of memory 252, for example, into 32 regions R910 through R941. The partition 710 may be divided into 32 regions and 128 regions while respectively storing IPV4 and IPV6 addresses prefixes and the HCAM 250 may determine the output port using LPM technique. However, each region may comprise unequal number of memory locations. For example, the HCAM logic 258, for example, may store more address prefixes in region R924 as compared to region R914.

In one embodiment, each anchor entry may comprise a lock bit equaling logic 1. For example, the regions R910 and R911 may respectively comprise entries 1001 and 1021 at the lowest address location of that region. The lock bit of each of the anchor entries 1001 and 1021 may equal 1. An entry in one region may not move into another region as the entries may not be allowed to cross the anchor entry. To this end, the anchor entries may have lock bit equaling 1 and the lock bit of the remaining entries including the gate entry may equal 0.

For example, the HCAM logic 258 may receive a new entry 1005 and determine the size of the new entry to equal 32 bits. The HCAM logic 258 may determine that the new entry is to be added to the region 910. In one embodiment, the HCAM logic 258 may maintain a mapping table 980, which comprises a region and the pointer to the gate entry of the region. In one embodiment, the mapping table may comprise pointers to the gate entries of the regions 910 to 941.

After retrieving the pointer to the gate entry of the identified region, the HCAM logic 258 may add the new entry into the identified region. For example, the HCAM logic 258 may retrieve the pointer X0, which identifies the gate entry of the region 910 and may add the new entry 1005 at the gate entry 1004 of the region 910.

In one embodiment, the HCAM logic 258 may expand a region based on the number of entries stored in that region. For example, if the number of entries stored in the region 910 reaches 90% of the total capacity of the region 910, the HCAM logic 258 may expand the size of the region 910 by adjusting the unused memory locations of the remaining regions. Such an expansion may be performed by adjusting the anchor entries of the remaining regions.

An embodiment of the memory 252 that quickly adds a new entry into a region of the HCAM 250 is illustrated in FIG. 10. The CAM of FIG. 10(a) may comprise entries 1001-1004 of length equaling 32 bits and entries 1021-1025 of length equaling L2. Assuming that a new entry 1005 is added into the CAM that does not operate based on the hole-filling technique, the CAM adds the new entry 1005 after the entry 1004. In the process of adding the new entry 1005, the CAM may move the entries 1021-1025 to the next higher address location as shown in FIG. 10(b). In the above example, the CAM may consume substantial processing cycles to add the new entry 1005.

However, the HCAM 250 operating based on the hole-filling technique may partition the memory 252 into one or more partitions. For example, the FIG. 10(c) is shown comprising two regions 910 and 911, each region respectively comprising entries 1001-1004 and 1021-1025. Each region is identified by the presence of an anchor entry 1001 and 1021 having corresponding lock bits equaling logic 1. An entry, for example, 1022 or 1023 or 1024 or 1025 of region 911 may not be allowed to move up to region 910 as the entries 1022-1025 may not be allowed to cross the anchor entry 1021.

The new entry 1005 is added at the gate entry of the region 910. The HCAM logic 258 may move the new entry 1005 up to a lower address based on the hole filling technique. For example, the new entry 1005 of length 32 bits may be added at the gate entry 1004 of the region 910 as shown in FIG. 10(c). The HCAM logic 258 may swap entries 1003 and 1004 as the entry 1003 represents a hole (valid bit=0) based on hole-filling technique described in FIG. 3 above and as depicted in FIG. 10(d). The HCAM logic 258 may then add the new entry 1005 in place of the entry 1003 as depicted in FIG. 10(e).

The HCAM logic 258 may update the entries, of the memory 252, based on the partitioning, dividing each partition into regions, and hole-filling technique by simply filling the holes in that region into which a new entry is added. Such an approach may quickly add a new entry into the HCAM 250. The adding of the new entry consumes substantially less time as only the holes of the corresponding region may be filled up as compared to moving all the entries below the location at which a new entry is to be added.

Thus, the HCAM 250, based on partitioning, dividing each partition into regions and the hole-filling technique, may utilize substantially less power by switching ON the partitions that are being used and switching OFF the remaining partitions. Also, the HCAM 250 may quickly add one or more new entries while updating the entries.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method of processing a plurality of entries stored in a content addressable memory comprising
  generating one or more pairs based on grouping the plurality of entries stored in adjacent locations,
  swapping a first entry and a second entry of each pair in response to determining that the first entry of each pair is invalid and the second entry of each pair is valid, and
  continuing the swapping until valid entries of the plurality of the entries are stored contiguously.

2. The method of claim 1 further comprising
  creating N memory partitions,
  storing the valid entries in each memory partition contiguously based on the swapping of entries in each pair, and
  switching ON a second memory partition if the number of entries in a first memory partition reaches a first threshold value.

3. The method of claim 1 further comprising
  creating N memory partitions,
  storing the valid entries in each memory partition contiguously based on the swapping of entries in each pair, and
  checking whether threshold values of each non-empty memory partition is reached and switching ON the next higher memory partition if the valid entries in a lower memory partition reaches a corresponding threshold value.

4. The method of claim 1, comprising
creating N memory partitions,
storing the valid entries in each memory partition contiguously based on the swapping of entries in each pair, and
switching OFF a $N^{th}$ memory partition if the number of entries of a $(N-1)^{th}$ memory partition is less than the threshold value of the $(N-1)^{th}$ partition and if the $N^{th}$ partition is empty.

5. The method of claim 1, comprising
creating N memory partitions,
storing the valid entries in each memory partition contiguously based on the swapping of entries in each pair, and
checking the threshold of each non-empty memory partition and switching OFF the next higher memory partition if the valid entries in a corresponding lower memory partition is less than the corresponding threshold.

6. The method of claim 1 comprising
creating N memory regions in each partition,
storing the valid entries in each memory region contiguously based on the swapping of entries in each pair,
receiving a new entry, and
adding the new entry at a gate entry of one of the N memory regions identified to store the new entry after identifying the gate entry based on searching a mapping table.

7. The method of claim 6, further comprising avoiding an entry of one region being swapped with the entry of another region by having an anchor entry at the first location of each region.

8. The method of claim 7 wherein the anchor entry of each region is identified by one logic level of a lock bit and the remaining entries are identified by the another logic level of the lock bit.

9. The method of claim 7 comprising adjusting the anchor entry of a second region to expand memory space of a first region, if the entries in the first region exceed a pre-specified level and if the second region comprise memory space to be transferred to the first region.

10. A network device comprising
a network interface to transfer packets,
a content addressable memory comprising a plurality of storage locations to store entries, the content addressable memory to generate at least one pair of adjacent locations, to swap a first entry and a second entry of the at least one pair in response to determining that the first entry is invalid and the second entry is valid, and
a controller to process the packets based on the entries stored in the content addressable memory.

11. The network device of claim 10 further comprising
a partition selection logic to create N memory partitions from the plurality of storage locations, to store the valid entries in each memory partition contiguously based on the swapping of entries in each pair, to switch ON a second memory partition if the count of a counter indicates the entries stored in a first memory partition has reached a first threshold value stored in a threshold table,
the counter to count the number of entries stored in each memory partition, and
the threshold table to store the threshold values of each memory partition.

12. The network device of claim 10 further comprising
a partition selection logic to create N memory partitions from the plurality of storage locations, to store the valid entries in each memory partition contiguously based on the swapping of entries in each pair, to check whether the threshold value of each non-empty memory partition is reached and to switch ON the next higher memory partition if the valid entries in a lower memory partition reaches a corresponding threshold value,
a counter to count the number of entries stored in each memory partition,
a threshold table to store the threshold values of each memory partition.

13. The network device of claim 10 further comprising
a partition selection logic to create N memory partitions from the plurality of storage locations, to store the valid entries in each memory partition contiguously based on the swapping of entries in each pair, to switch OFF a $N^{th}$ memory partition if a count value of a counter indicates the entries stored in a $(N-1)^{th}$ memory partition is less than the threshold value of the $(N-1)^{th}$ partition and if the $N^{th}$ partition is empty, and
the counter to count the number of entries stored in each memory partition,
a threshold table to store the threshold values of each memory partition.

14. The network device of claim 10 further comprising
a counter to count the number of entries stored in each memory partition,
a threshold table to store the threshold values of each memory partition, and
a partition selection logic to create N memory partitions from the plurality of storage locations, to store the valid entries in each memory partition contiguously based on the swapping of entries in each pair, to check the threshold of each non-empty memory partition and to switch OFF the next higher memory partition if the valid entries in a lower memory partition reaches a corresponding threshold value.

15. The network device of claim 10 further comprising
a mapping table to store the pointers to gate entries of M regions, and
the content addressable memory logic to create the M memory regions in each partition of N partitions formed from the plurality of storage locations, to store the valid entries in each memory region, of the M memory regions, contiguously based on the swapping of entries in each pair of the one or more pairs, to receive a new entry, to add the new entry at a gate entry of one of the M memory regions identified to store the new entry after identifying the gate entry based on searching a mapping table.

16. The network device of claim 15 comprising an anchor entry at the first location of each region to avoid an entry of one region being swapped with the entry of another region.

17. The network device of claim 16 the anchor entry of each region is identified by one logic level of a lock bit and the remaining entries are identified by the another logic level of the lock bit.

18. The network device of claim 15 comprising a content addressable memory logic to adjust the anchor entry of a second region to expand memory space of a first region, if the entries in the first region exceed a pre-specified level and if the second region comprise memory space to be transferred to the first region.

19. A system comprising
a plurality of network devices comprising a first network device and a second network device,
a network to couple a first network device and a second network device of the plurality of the network devices, the second network device to send one or more packets to the first network device, and the first network device to store a plurality of entries, to generate one or more pairs of the plurality of entries, each pair comprising entries stored in the adjacent locations, to swap a first entry and a second entry of each pair in response to determining that the first entry of each pair is invalid and the second entry of each pair is valid, and to continue the swapping until the valid entries are stored contiguously.

20. The system of claim 19 comprising the first network device to create N number of partitions in a memory, to store the valid entries in each partition contiguously based on the swapping of the entries, to switch ON a second partition if the entries stored in a first partition reached a first threshold value, to check whether threshold values of each non-empty partition is reached and to switch ON the next higher partition if a threshold value of the lower partition is reached.

21. The system of claim 19 comprising the first network device to create N number of partitions in a memory, to store the valid entries in each partition contiguously based on the swapping of the entries, to switch OFF a $N^{th}$ partition if the number of entries of a $(N-1)^{th}$ partition is less than the corresponding threshold value and if the $N^{th}$ partition is empty, to check threshold values of each non-empty partition and to switch OFF the next higher partition if the threshold of the corresponding lower partition is not reached.

22. The system of claim 19 comprising the first network device to create N number of regions, to store the valid entries in each region contiguously based on the swapping of the entries, to receive a new entry, to add the new entry at a gate entry of one of the N number of regions identified to store the new entry, wherein the gate entry is identified by searching a mapping table.

23. The system of claim 19 wherein the first network device is router.

24. The system of claim 19 wherein the second network device is a client system.

25. The system of claim 19 the first network device to process the packet received from the second network device and to determine the output port on which the packets is sent onward.

26. The system of claim 19 the first network device to process the packet received from the second network device to determine the presence of one or more pre-defined strings in the packet payload.

* * * * *